United States Patent [19]

Parker et al.

[11] Patent Number: 5,568,964
[45] Date of Patent: Oct. 29, 1996

[54] FIBER OPTIC LIGHT EMITTING PANEL ASSEMBLIES AND METHODS OF MAKING SUCH PANEL ASSEMBLIES

[75] Inventors: Jeffery R. Parker, Strongsville; Mark D. Miller, Parma, both of Ohio

[73] Assignee: Lumitex, Inc., Strongsville, Ohio

[21] Appl. No.: 911,507

[22] Filed: Jul. 10, 1992

[51] Int. Cl.⁶ ............................................. F21V 7/04
[52] U.S. Cl. .............................. 362/32; 385/901; 156/88
[58] Field of Search ........................ 362/32; 385/901; 156/88

[56] References Cited

U.S. PATENT DOCUMENTS

| | | |
|---|---|---|
| 2,001,381 | 5/1935 | Davison ............................ 156/88 |
| 2,517,389 | 8/1950 | Dow et al. ........................ 156/88 |
| 2,886,481 | 5/1959 | Swan ................................ 156/88 |
| 3,508,589 | 4/1970 | Derick et al. . | 
| 3,772,112 | 11/1973 | Lyons et al. ..................... 156/88 |
| 4,234,907 | 11/1980 | Daniel . | 
| 4,428,995 | 1/1984 | Yokono et al. .................. 156/88 |
| 4,519,017 | 5/1985 | Daniel . | 
| 4,560,427 | 12/1985 | Flood ............................... 156/88 |
| 4,761,047 | 8/1988 | Mori . | 
| 4,763,984 | 8/1988 | Awai et al. . | 
| 4,885,663 | 12/1989 | Parker . | 
| 4,907,132 | 3/1990 | Parker . | 
| 5,005,108 | 4/1991 | Pristash et al. . | 
| 5,021,928 | 6/1991 | Daniel . | 
| 5,042,900 | 8/1991 | Parker . | 
| 5,069,735 | 12/1991 | Reynolds ......................... 156/88 |
| 5,183,323 | 2/1993 | Daniel . |

*Primary Examiner*—Carroll B. Dority
*Attorney, Agent, or Firm*—Renner, Otto, Boisselle & Sklar, P.L.L.

[57] ABSTRACT

Fiber optic light emitting panel assemblies include one or more light emitting layers which are sealed along the side edges and/or an end edge to hold the fill threads in position and keep the light emitting portions from fraying at the edges. A thin film, sheet or coating may be applied to one or both sides of the light emitting portions of the panel assemblies. At one or both ends of the light emitting portions is a light cable which may be formed by randomly distributing the optical fibers which comprise the light cable into a plurality of discrete bundles each including fibers extending from different locations across substantially the entire width of the light emitting portions, bringing the discrete bundles together to form a single bundle of all of the fibers in each light cable, and applying a connector assembly to the cut ends of all of the fibers in each light cable.

41 Claims, 4 Drawing Sheets

FIBER OPTIC LIGHT EMITTING PANEL ASSEMBLIES AND METHODS OF MAKING SUCH PANEL ASSEMBLIES

FIELD OF THE INVENTION

This invention relates generally to improvements in light emitting panel assemblies made of woven optical fibers and to methods of making such panel assemblies.

BACKGROUND OF THE INVENTION

It is generally known to make light emitting panel assemblies from one or more layers of woven optical fiber strands. Light is caused to be emitted from the light emitting portion of the panel assemblies by disrupting the surface of the optical fibers in the light emitting portion as by scratching or otherwise deforming or bending the optical fibers at a plurality of discrete locations along the length of the fibers such that the angle of bend approximately exceeds the angle of internal reflection. The percentage of light emitted from each bend is proportional to the bend radius and arc length. By controlling the weave spacing and pattern of the woven optical fibers in the light emitting portion, one can control the desired light output pattern therefrom.

Woven fiber optic light emitting panel assemblies generally of this type are disclosed in U.S. Pat. Nos. 4,885,663; 4,907,132 and 5,042,900, assigned to the same assignee as the present application, which are incorporated herein by reference.

SUMMARY OF THE INVENTION

The present invention relates to certain improvements in such fiber optic light emitting panel assemblies and to the methods of making same.

In accordance with one aspect of the invention, the light emitting portions of the panel assemblies are sealed along one or more edges to hold the fill threads in position and keep the light emitting portions from fraying at the sealed edge or edges. In one form of the invention, the side edges are heat sealed. Alternatively, the side edges may be sealed by applying an adhesive to the side edges or by taping the side edges. In lieu of or in addition to sealing the side edges, one or both end edges of the light emitting portions may be similarly sealed.

In accordance with another aspect of the invention, a plurality of smaller panel assemblies may be made from a single larger panel assembly by sealing the larger light emitting portion along one or more spaced apart longitudinal areas or strips intermediate the side edges, and then slitting the larger light emitting portion intermediate the width of the intermediate sealed areas to separate the larger light emitting portion and associated light cable fibers into a plurality of individual smaller light emitting panel assemblies.

In accordance with another aspect of the invention, the light emitting portions of the panel assemblies may comprise a plurality of individually formed layers of woven optical fibers joined together along one or more edges to maintain the weave spacing in such layers staggered in relation to each other to provide for more uniform light output from the light emitting portions.

In accordance with another aspect of the invention, one or more light cables may be provided at one or both ends of the light emitting portion of each panel assembly. Preferably the light cables are formed during the continuous manufacture of a plurality of panel assemblies by interrupting the weaving process between light emitting portions while continuing to advance the optical fibers to form non-woven optical fiber lengths which comprise the light cable portions. Predetermined optical fibers within each light cable length may be separated into different groups or layers of fibers and the layers mechanically maintained separated from each other so that when the continuously made panel assemblies are cut apart and the separate layers of fibers which comprise the light cables are bundled together, the optical fibers will be randomly distributed within the bundle. A connector assembly is then attached to a remote end of each bundle of optical fibers which comprise each light cable to maintain the desired distribution of the optical fibers in each light cable and provide an interface between the light cable and a remote light source.

In accordance with another aspect of the invention, a thin film, sheet or coating may be applied to one or both sides of sealed or non-sealed light emitting portions of the panel assemblies. In one form of the invention, the film or sheet covering comprises a tube or sleeve surrounding the light emitting portion. One or both ends of the tube may be joined to one or both end edges of the light emitting portion as desired. Also, one or more light cables may be connected to one or both ends of the light emitting portion for transmitting light to the light emitting portion from one or more remote light sources. In another form of the invention, the film or sheet covering comprises a pocket having an opening along one side edge only for insertion of the light emitting portion into the pocket. This film or sheet covering or coating over one or both sides of the light emitting portion may comprise a clear or translucent film, a prismatic or polarizer film, or a diffuser for diffusing or directing the light emitted from the light emitting portion. Alternatively, the film or sheet covering or coating over one side of the light emitting portion may comprise a reflector for reflecting light emitted from one side of the light emitting portion back through the light emitting portion such that light is emitted from only one side of the light emitting portion.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
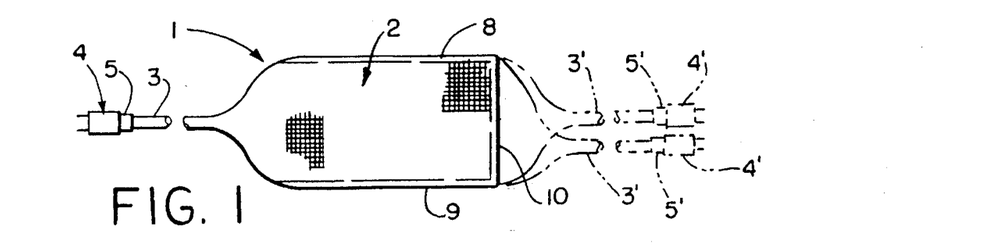
FIG. 1 is a schematic fragmentary top plan view of one form of light emitting panel assembly in accordance with this invention.

Referring now in detail to the drawings, and initially to FIG. 1, there is schematically shown one form of fiber optic light emitting panel assembly 1 in accordance with this invention including a light emitting portion 2 and one or more fiber optic light cable portions 3 at one or both ends of the light emitting portion for transmitting light from one or more remote light sources 4 to one or both ends of the light emitting portion. One such light cable portion 3 is shown in solid lines in FIG. 1 connected to one end of the light emitting portion, and two additional light cable portions 3' are shown in phantom lines connected to the other end of the light emitting portion. At the outermost end of each light cable is a connector assembly 5 or 5' which serves as an interface between the optical fiber ends of the light cable and the remote light source 4 or 4'. The light cable 3 or 3' and connector assembly 5 or 5' may be of the type disclosed, for example, in the aforementioned U.S. Pat. No. 5,042,900.

Figure 2:
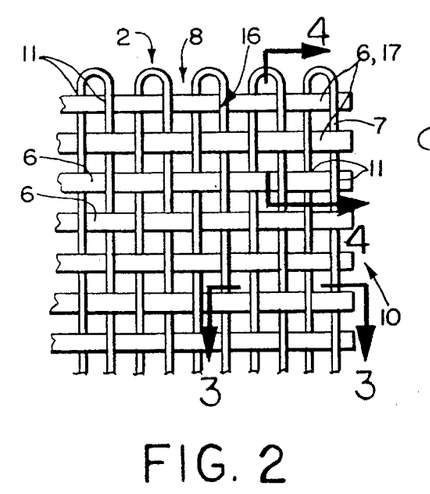
FIG. 2 is an enlarged schematic top plan view of the upper right-hand corner of the light emitting portion of the panel assembly of FIG. 1.

As schematically illustrated in FIG. 2, the light emitting portion 2 of the panel assembly comprises one or more layers of woven optical fibers 6. Usually the optical fibers 6 of each layer are woven only in the warp direction, with fill threads 7 woven in the weft direction. However, the fill threads 7 could also be optical fibers if desired. The spacing between both the optical fibers 6 and the fill threads 7 is greatly exaggerated in FIG. 2 for reasons of clarity.

Each optical fiber 6 may consist of one or more optical fiber strands each including a light transmitting core portion of a suitable transparent material and an outer sheath or cladding of a second transparent material having a relatively lower index of refraction than the core material to assist in preventing the escape of light along its length. The core material can be made of either glass or plastic or a multi-strand filament having the desired optical characteristics. The index of refraction of the outer sheath material is less than that of the core material, whereby substantially total reflection is obtained at the sheath-core interface, as well known in the art.

Figure 3:
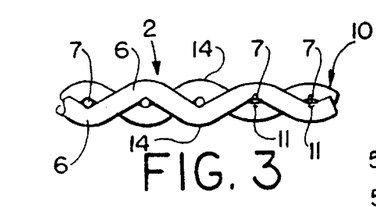
FIG. 3 is an enlarged schematic longitudinal section through an end edge of the light emitting portion of FIG. 2 taken generally on the plane of the line 3—3 thereof showing one or more fill threads adjacent the end edge heat sealed to the longitudinal fibers.

Light is emitted from the light emitting portion 2 as by weaving the optical fibers 6 and fill threads 7 to produce bends 14 in the optical fibers as schematically shown in FIG. 3 that cause a percentage of the light to escape at the bends. By controlling the weave spacing and pattern of the optical fibers and fill threads in the light emitting portion, any desired output pattern of light from the light emitting portion can be achieved.

Figure 3A:
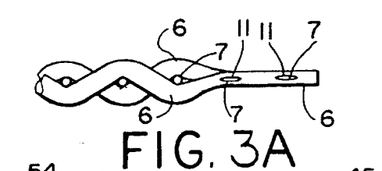
FIG. 3A is an enlarged fragmentary transverse section through an end edge of a light emitting portion similar to FIG. 3 but showing more severe heat sealing of the fill threads and longitudinal fibers together at the end edge.
Figure 4:
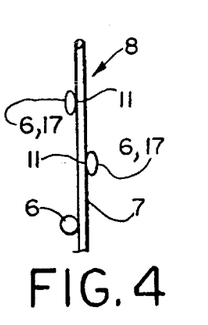
FIG. 4 is an enlarged fragmentary transverse section through one of the side edges of the light emitting portion of FIG. 2 taken generally along the plane of the line 4—4 thereof showing one or more fill threads heat sealed to the longitudinal fibers adjacent such side edge.

At least one edge of the light emitting portion 2 is desirably sealed by adhering the optical fibers 6 and fill threads 7 together to hold the fill threads 7 in position and keep the optical fibers 6 from separating or fraying from the light emitting portion. In the embodiment shown in FIGS. 1 through 4, the optical fibers 6 and fill threads 7 adjacent both side edges 8, 9 and one end edge 10 of the light emitting portion 2 are heat sealed together at 11. FIG. 3A shows more severe heat sealing between the fibers 6 and fill threads 7 than in FIGS. 2 through 4.

Figure 4A:
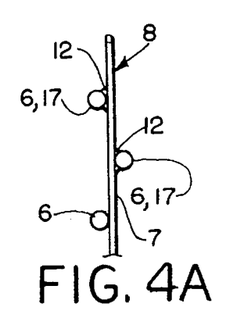
FIG. 4A is an enlarged fragmentary transverse section through a side edge of a light emitting portion of a panel assembly similar to FIG. 4 but showing one or more fill threads adhesively bonded to the longitudinal fibers.
Figure 5:
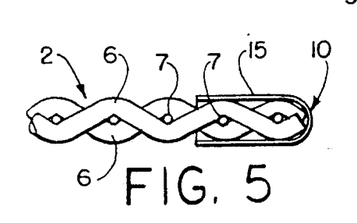
FIG. 5 is an enlarged fragmentary longitudinal section through an end edge of a light emitting portion of a panel assembly similar to FIG. 3 but showing one or more fill threads and longitudinal fibers sealed together adjacent the end edge by applying pressure sensitive adhesive tape thereto.

Alternatively, one or both side edges and, if desired, one or both end edges may be sealed either by ultrasonic welding or gluing the optical fibers and fill threads together at 12 along one or both side edges and end edges as schematically shown in FIG. 4A, or by applying pressure sensitive adhesive tape 15 thereto as schematically shown in FIG. 5. Moreover, the border areas 16 of the side edges 8, 9 of the light emitting portion 2 which are sealed may be woven with nonoptical fibers 17 as schematically shown in FIG. 2 if desired. Although two optical fibers 6 and fill threads 7 are shown sealed together along one or more edges of the light emitting portion in FIGS. 2 through 5, it should be understood that more or less fibers and fill threads may be sealed together along such edges as desired.

Figure 10:
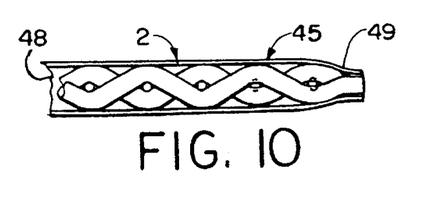
FIG. 10 is an enlarged schematic fragmentary longitudinal section showing a light emitting portion of a panel assembly inserted into the tube of FIG. 8 with one end of the tube in sealing engagement with an end edge of the light emitting portion.
Figures 10A, 13, 14, 15:
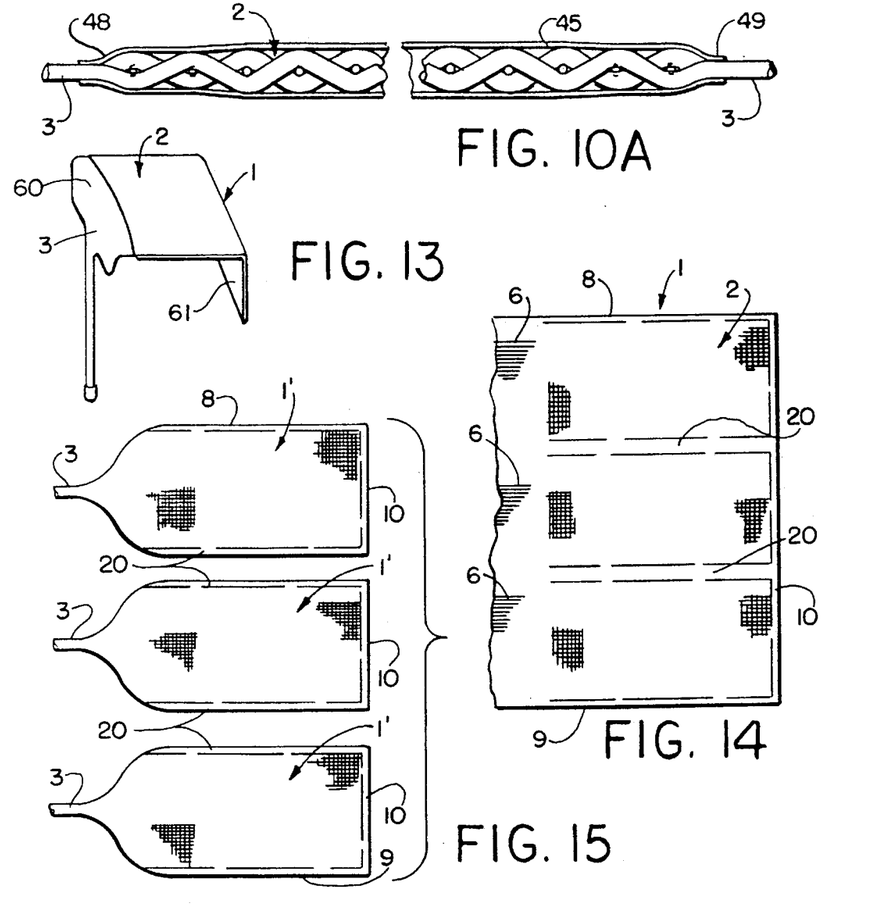
FIG. 10A is an enlarged schematic fragmentary longitudinal section through a light emitting portion of a panel assembly inserted into a tube similar to FIG. 10 but showing one or more light cables connected to both ends of the light emitting portion.
FIG. 13 is a schematic perspective view, on a reduced scale, showing a panel assembly in accordance with this invention heat formed into a desired shape for a particular application.
FIG. 14 is a schematic fragmentary top plan view of a multi-width panel assembly in accordance with this invention.
FIG. 15 is a schematic fragmentary top plan view of a plurality of panel assemblies made from the enlarged panel assembly of FIG. 14.

During the manufacturing process, a plurality of smaller panel assemblies 1' may be made from a single larger panel assembly 1 by sealing the larger light emitting portion 2 at one or more areas 20 intermediate the side edges 8, 9 along the axial length thereof as schematically shown in FIG. 14, and then slitting the larger light emitting portion 2 intermediate the width of the intermediate sealed areas 20 to separate the larger light emitting portion and associated light cable fibers 6 into a plurality of smaller light emitting panel assemblies 1' as schematically shown in FIG. 15.

Figure 22:
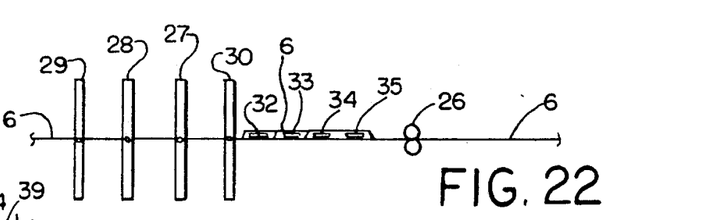
Figure 23:
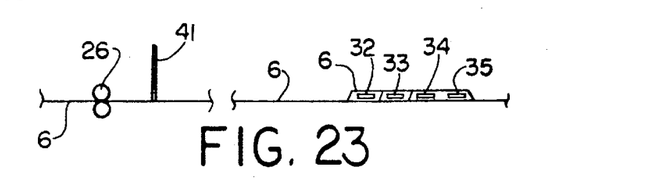

The light cables 3 may be formed during the continuous manufacture of such light emitting panel assemblies 1 by periodically interrupting the weaving process while continuing to advance the optical fibers 6 through automatic process equipment 25 to produce the non-woven optical fiber lengths which comprise the light cable portions as schematically shown in FIGS. 16–23. After one or more of the continuously formed panel assemblies have cleared the exit fiber web guide 26, the desired length of non-woven optical fibers 6 needed to form the light cable portion 3 is severed from the next panel assembly as schematically shown in FIG. 23 and the cut fibers are bundled together to form either a ribbon cable or a round cable as described hereafter. The guide 26 may either be a pair of bars or rolls used to maintain the fibers at the desired height during the manufacturing process. During the bundling of the light cable fibers together, it is desirable to randomly distribute the optical fibers within the cable so that when a connector assembly is attached to the cable fibers adjacent the cut ends thereof, the relative position of each optical fiber is generally random or in a predetermined position to produce predetermined lighting effects in the light emitting portion of the panel assembly when the light cable is coupled with a light source.

In the process equipment 25 shown in FIGS. 16–22, the fiber harnesses 27–30 which raise and lower different optical fibers 6 to permit the fill threads 7 to be passed between the optical fibers 6 during the weaving process, may also be used to separate predetermined individual optical fibers into different groups or layers of fibers. In the example shown in FIGS. 16–22, four harnesses 27–30 are shown, each including a plurality of spaced apart heddles 31 through which individual optical fibers pass at different locations across substantially the entire width of the weaving section. However, it should be understood that more or less than four harnesses may be provided as desired. The fiber harnesses 27–30 may be raised and lowered in any desired sequence to separate predetermined individual fibers into different layers or groups and the fibers in the different layers or groups maintained separate from each other by insertion of mechanical dividers or separators such as strings or cable ties 32–35 between the respective layers as described hereafter.

Figure 16:
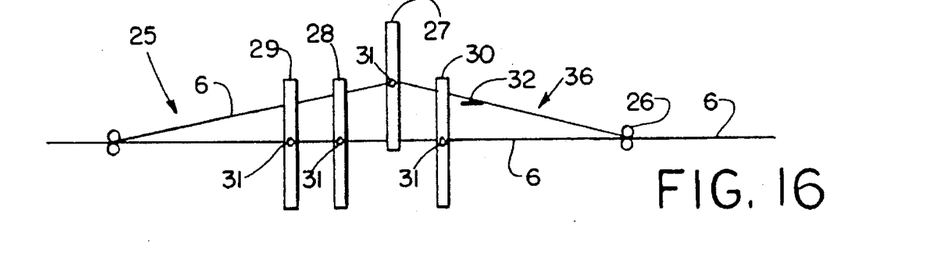
FIGS. 16 through 23 are schematic illustrations sequentially showing how automatic process equipment used to weave the light emitting portions of the panel assemblies may aim be used to randomly distribute the optical fibers which comprise the light cable portions of the panel assemblies into a plurality of discrete bundles each including fibers from different locations across substantially the entire width of the light emitting portions.
Figure 17:
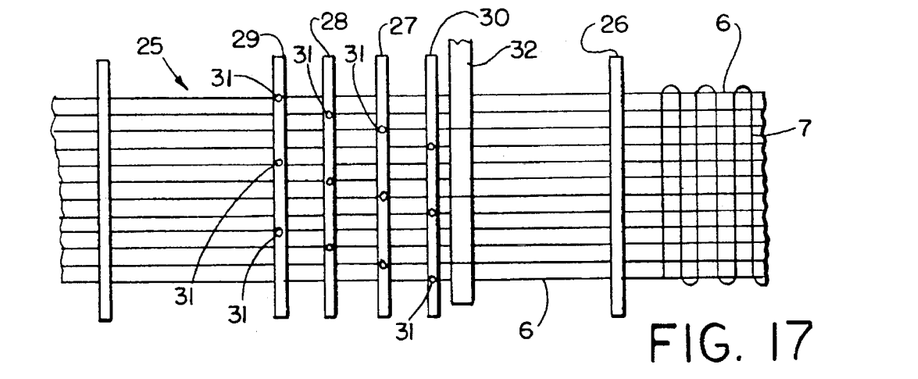
Figure 18:
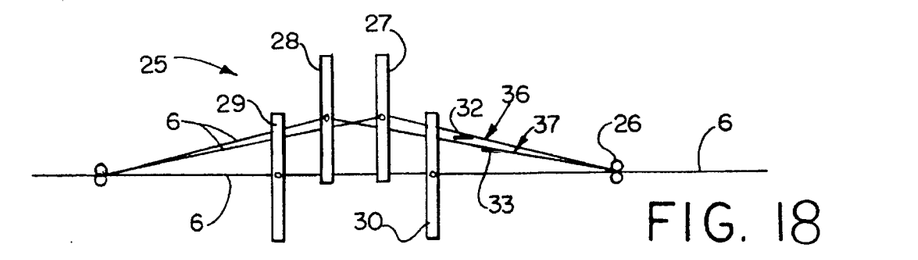
Figure 19:
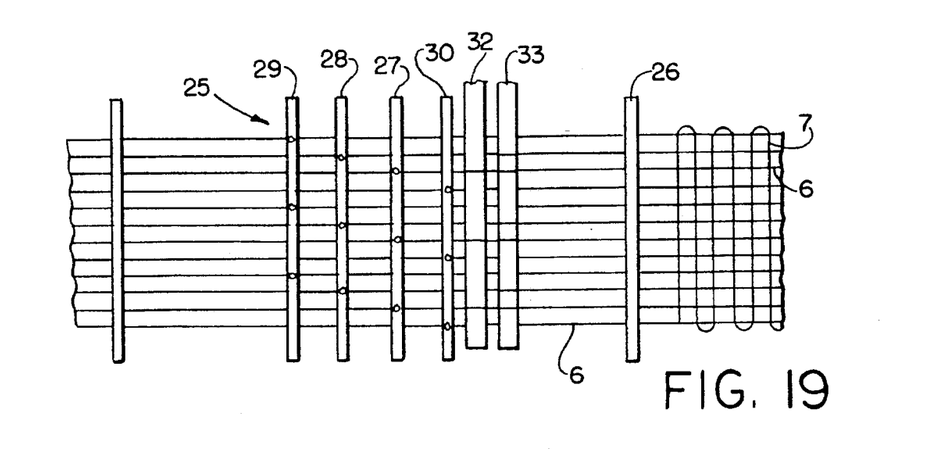
Figure 20:
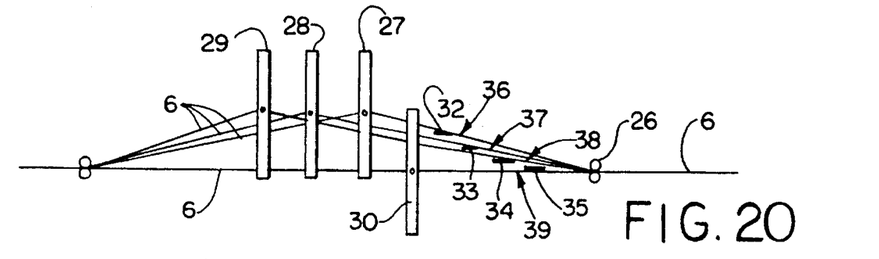
Figure 21:
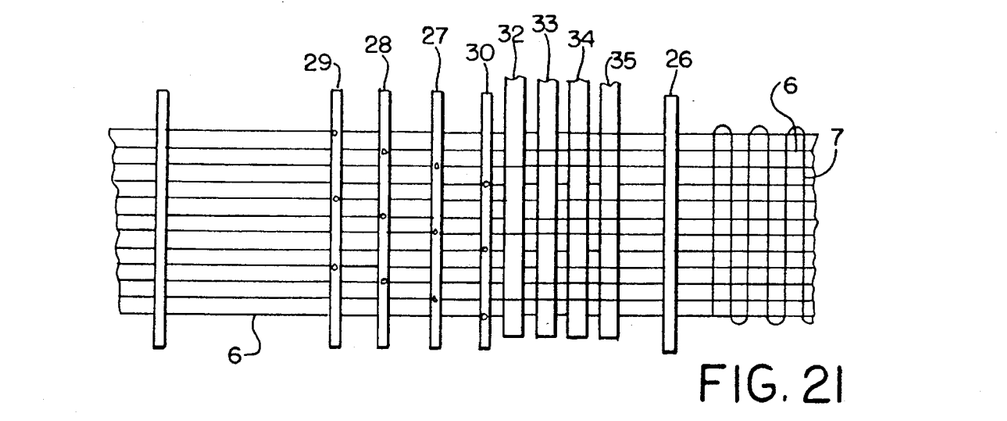
Figure 24:
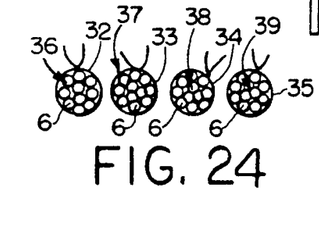
FIG. 24 is an enlarged schematic transverse section through a plurality of such discrete bundles of optical fibers which comprise a light cable spaced apart from each other.
Figure 25:
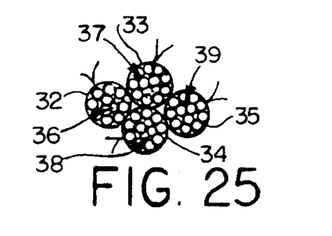
FIG. 25 is an enlarged schematic fragmentary transverse section through a plurality of discrete bundles of optical fibers which comprise a light cable similar to FIG. 24 but showing the bundles in close relation to each other.
Figure 26:
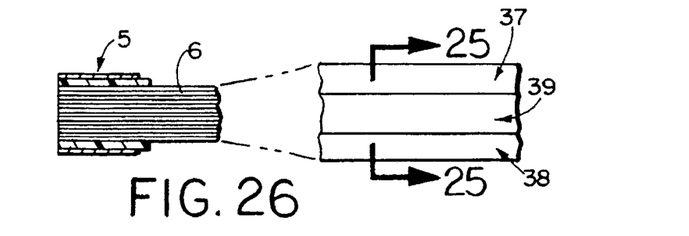
FIG. 26 is an enlarged schematic fragmentary longitudinal section through a connector assembly applied to all of the cut ends of the bundled optical fibers of FIG. 25.

FIGS. 16–21 show the fibers in the randomization area of the panel assembly being separated into four separate layers 36–39 first by raising a first harness 27 and inserting a first separator 32 between a first group 36 of raised fibers and the remaining fibers as shown in FIGS. 16 and 17, then raising a second harness 28 and inserting a second separator 33 between a second group 37 of raised fibers and the remaining fibers as shown in FIGS. 18 and 19, and then raising a third harness 29 and inserting one or two additional separators 34 and 35 between a third group 38 of raised fibers and the remaining group 39 of fibers. Then all of the raised harnesses 27–29 are returned to their original positions and the fibers are advanced through the exit fiber web guide 26 with the separators 32–35 still in position between the various groups 36–39 of fibers as schematically shown in FIG. 22. After one or more continuously formed panel assemblies have cleared the exit fiber web guide 26, the desired length of non-woven optical fibers 6 needed to form the light cable 3 is severed by a knife 41 as schematically shown in FIG. 23 and the individual separators 32–35 are wrapped around the separate groups of fibers to hold them in the separate bundles as shown in FIG. 24. If desired, only one separator 34 need be inserted between the third group 38 of raised fibers and the remaining group 39 of fibers, in which event the fourth separator 35 is wrapped around the remaining group 39 of fibers at this time. Then the separate bundles are brought together as shown in FIG. 25 and a connector assembly 5 is applied to the cut ends as schematically shown in FIG. 26. Finally the separators 32–35 are removed to complete the assembly.

Figure 11:
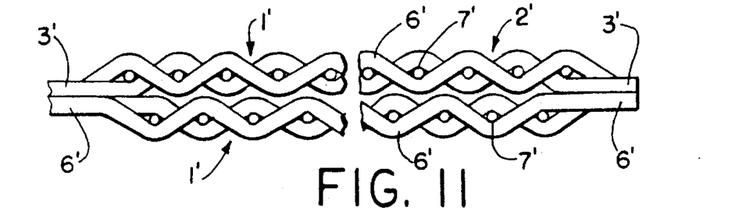
FIG. 11 is an enlarged schematic fragmentary longitudinal section through a multi-layered light emitting portion of a panel assembly.
Figure 12:
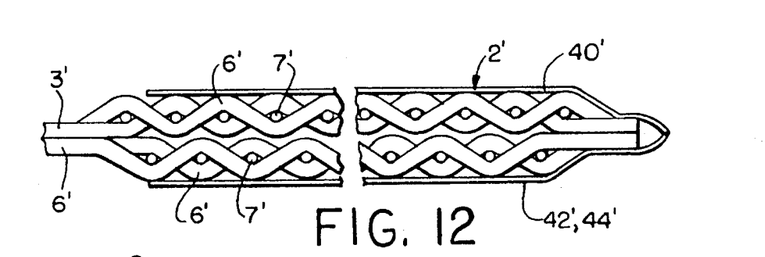
FIG. 12 is an enlarged schematic fragmentary longitudinal section through a multi-layered light emitting portion of a panel assembly similar to FIG. 11, but showing a thin film, sheet or coating over opposite sides of the light emitting portion.

If desired, two or more of these panel layers 1' may be joined together along one or both end edges and/or side edges to form a multi-layered light emitting portion 2' that emits a brighter and/or more uniform light. These layers may be joined together as by heat sealing, ultrasonic welding or gluing the end and/or side edges together. Also, they may be joined together by weaving, sewing, laminating or other joining method. Preferably, the multi-layers of the light emitting portion 2' are joined together such that their relative weave spacings are staggered as schematically shown in FIGS. 11 and 12 so that the light emitting portion 2' will produce a more uniform light output. The individual optical fibers 6' in the cable portion 3' of each panel layer may be randomly grouped into a plurality of discrete bundles and then bundled together to form one or more light cables for connection to one or more remote light sources as desired.

Figure 6:
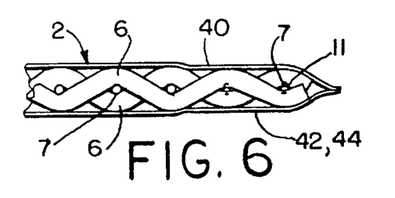
FIG. 6 is an enlarged fragmentary longitudinal section through an end edge of a light emitting portion of a panel assembly similar to FIG. 3 but showing a thin film, sheet or coating over opposite sides of the light emitting portion.

Also, a thin film, sheet or coating may be applied to one or both sides of the light emitting portion 2 or 2' and joined thereto as by heat sealing, ultrasonic welding, laminating, gluing, epoxying or any other method. FIGS. 6 and 12 show a separate sheet or film 40, 42 and 40', 42' suitably applied to opposite sides of a single and multi-layered light emitting portion 2 and 2', respectively. One or both layers 40, 42 and 40', 42' may be a clear or translucent film, prismatic film, or coating used to protect the light emitting portion and/or diffuse or direct the light output from one or both sides of the light emitting portion. Also, one or both layers may be used to produce light or color effects. Moreover, one of the layers may comprise a back reflector for reflecting light back through the light emitting portion such that light is emitted from only one side of the light emitting portion.

Figure 8:
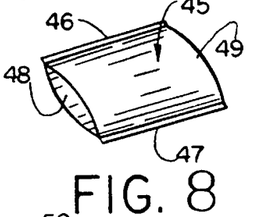
FIG. 8 is a schematic perspective view, on a reduced scale, of a tube for receiving one or more light emitting portion layers of a panel assembly therein.

The two layers 40, 42, one of which may be a back reflector 44, may initially be in the form of a tube 45 sealed along two sides 46, 47 as schematically shown in FIG. 8. One or more light emitting layers 2, 2' may be inserted into one end 48 of the tube 45, and one or both ends 48, 49 sealed to the end edges of the light emitting layers to hold the light emitting layers within the tube as schematically shown in FIGS. 10 and 10A. Also, one or more light cables 3 may be connected to one or both ends of the light emitting portion 2 through the open ends of the tube 45 as schematically shown in FIG. 10A. Where more than one light emitting layer is inserted, the sealing of one or both ends of the tube 45 to the multi-layers 2' may be used to maintain the weave spacing in such layers in the desired staggered relation to provide more uniform light output from the light emitting portion similar to FIG. 12.

Figure 7:
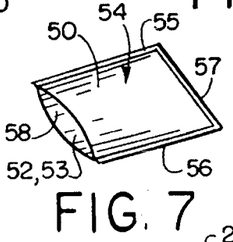
FIG. 7 is a schematic perspective view, on a reduced scale, of a pocket for receiving one or more light emitting portion layers of a panel assembly therein.
Figure 9:
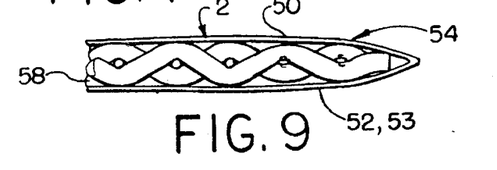
FIG. 9 is an enlarged schematic fragmentary longitudinal section showing a light emitting portion of a panel assembly inserted into the pocket of FIG. 7.

Alternatively, the two layers 50, 52, one of which may be a back reflector 53 if desired, may be in the form of a pocket 54 sealed along two sides 55, 56 and one end 57, leaving the other end 58 open as shown in FIG. 7 for insertion of one or more light emitting layers 2 or 2' into the pocket 54 to complete the panel assembly as schematically shown in FIG. 9.

The light emitting portions 2 and 2' and light cable portions 3 and 3' of the panel assemblies may be left flat or heat formed to different shapes for different applications. One such panel assembly 1 is schematically shown in FIG. 13 heat formed into a generally U-shape with the ends 60, 61 of the light emitting portion 2 and light cable portion 3 extending generally at right angles to the remainder of the light emitting portion.

Such light emitting panel assemblies may be used for different applications, including for example back lighting, medical light sources, product lighting and theatrical applications and safety lighting. Typical back lighting applications would be back lighting liquid crystal displays, membrane switches, alphanumeric displays, camera systems used in inspection, sorting, counting and assembly operations, and other instrumentation involving graphics, color or high information content and the like. Typical medical light sources would be for phototherapy, diagnostic, dental and other medical applications. Typical product lighting applications would be food inspection lighting, hazardous area lighting, and exit lighting. Typical safety lighting would be automotive courtesy and safety lighting and athletic safety lighting, for example, for jogging suits and running shoes and the like.

A variety of remote light sources may also be used for providing light to the panel assemblies including for example light emitting diodes, halogen lights, incandescent bulbs, arc lamps, and so on.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A light emitting panel assembly comprising a light emitting portion, covering means comprising a clear or translucent tube surrounding said light emitting portion, one end of said tube and one end of said light emitting portion being sealed together, and another end of said tube being open for extension of a light cable from another end of said light emitting portion outwardly of said another end of said tube to a remote light source.

2. The assembly of claim 1 wherein opposite ends of said tube are sealed to opposite end edges of said light emitting portion.

3. A method of forming a plurality of light emitting panel assemblies comprising the steps of weaving a plurality of optical fibers and fill threads extending transversely of the fibers into a light emitting portion having disruptions or bends at discrete locations along the length of the fibers to allow light to be emitted therefrom, continuing the optical fibers beyond one end edge of the light emitting portion, adhering the fibers and fill threads together along side edges of the light emitting portion and along one or more spaced apart longitudinal strips intermediate the side edges to form one or more intermediate sealed areas extending the full length of the light emitting portion, and slitting the light emitting portion intermediate the width of the intermediate sealed areas to separate the light emitting portion into a plurality of individual light emitting panel assemblies each having sealed side edges extending the full length of each individual light emitting portion, and a light cable extending from one end of each individual light emitting portion formed by a continuation of the fibers in each individual light emitting portion.

4. The method of claim 3 wherein the fibers of each individual light emitting panel assembly extend beyond an end of the light emitting portion to form a light cable for each individual light emitting panel assembly.

5. The method of claim 4 further comprising the steps of separating predetermined fibers which comprise each individual light cable and mechanically maintaining the separation between the fibers while attaching a connector to a remote end of the fibers which comprise each light cable to randomly distribute the fibers in each light cable and provide an interface between each light cable and a remote light source.

6. A method of making a plurality of light emitting panel assemblies comprising the steps of weaving a plurality of optical fibers and fill threads extending transversely of the fibers into a light emitting portion having disruptions or bends at discrete locations along the length of the fibers to allow light to be emitted therefrom, continuously making a plurality of light emitting panel assemblies by periodically interrupting the weaving process while continuing to advance the optical fibers to form predetermined lengths of non-woven optical fibers which comprise light cables between successive woven light emitting portions, cutting the panel assemblies apart at the ends of the non-woven fibers which comprise the respective light cables for each panel assembly, separating predetermined non-woven fibers which comprise each light cable and mechanically maintaining the separation between the non-woven fibers before cutting the panel assembly with the separated non-woven fibers from the next succeeding panel assembly, and maintaining the separation between the non-woven fibers while attaching a connector to a remote end of the non-woven fibers which comprise each light cable to randomly distribute the fibers in each light cable and provide an interface between each light cable and a remote light source.

7. The method of claim 6 wherein a plurality of fiber harnesses each including a plurality of spaced apart heddles through which individual fibers pass at different locations across substantially the entire width of the panel assemblies are sequentially moved relative to each other to separate the individual non-woven fibers into different layers and the different layers are maintained separated from each other by inserting mechanical dividers between the respective layers before cutting the panel assembly with the separated non-woven fibers from the next succeeding panel assembly, and the non-woven fibers are maintained separated from each other by the mechanical dividers while attaching the connector to a remote end of the non-woven fibers which comprise each light cable.

8. A light emitting panel assembly comprising a light emitting portion formed by a plurality of woven optical fibers and fill threads extending transversely of said fibers, said fibers having disruptions or bends at discrete locations along the length of said fibers to allow light to be emitted therefrom, said light emitting portion having side edges and end edges, means for adhering said fibers and said fill threads together along at least one of said edges of said light emitting portion to prevent said fibers from separating from said light emitting portion at said one edge, a light cable extending from one of said end edges of said light emitting portion, and covering means extending over opposite sides of said light emitting portion, said covering means comprising a pocket having at least one clear or translucent side and an opening along one edge for insertion of said light emitting portion into said pocket.

9. The assembly of claim 8 wherein said light cable extends from said one end edge of said light emitting portion out through said opening in said pocket.

10. The assembly of claim 8 wherein both sides of said pocket are clear or translucent.

11. The assembly of claim 8 wherein one side of said pocket comprises a prismatic or polarizer film.

12. The assembly of claim 8 wherein another side of said pocket comprises a back reflector for reflecting light emitted from an adjacent side of said light emitting portion back through said light emitting portion.

13. A light emitting panel assembly comprising a light emitting portion formed by a plurality of woven optical fibers and fill threads extending transversely of said fibers, said fibers having disruptions or bends at discrete locations along the length of said fibers to allow light to be emitted therefrom, said light emitting portion having side edges and end edges, means for adhering said fibers and said fill threads together along at least one of said edges of said light emitting portion to prevent said fibers from separating from said light emitting portion at said one edge, a light cable extending from one of said end edges of said light emitting portion, and covering means extending over opposite sides of said light emitting portion, the covering means extending over at least one side of said light emitting portion being clear or translucent, said covering means comprising a tube surrounding said light emitting portion.

14. The assembly of claim 13 wherein one end of said tube is open for connection of said light cable extending from said one end edge of said light emitting portion to a remote light source, and another end of said tube and another end edge of said light emitting portion are sealed together.

15. The assembly of claim 14 further comprising light cable means extending from said another end edge of said light emitting portion to a remote light source.

16. The assembly of claim 13 wherein opposite ends of said tube are sealed to opposite end edges of said light emitting portion.

17. The assembly of claim 13 further comprising another light cable means extending from another of said end edges of said light emitting portion, said light cable means and said another light cable means extending outwardly beyond opposite ends of said tube for connection of said end edges of said light emitting portion to a plurality of remote light sources.

18. A light emitting panel assembly comprising a light emitting portion formed by a plurality of woven optical fibers and fill threads extending transversely of said fibers, said fibers having disruptions or bends at discrete locations along the length of said fibers to allow light to be emitted therefrom, said light emitting portion having side edges and end edges, means for adhering said fibers and said fill threads together along at least one of said edges of said light emitting portion to prevent said fibers from separating from said light emitting portion at said one edge, and a light cable extending from one of said end edges of said light emitting portion, covering means surrounding said light emitting portion, said covering means comprising a pocket which is open only along one edge for insertion of said light emitting portion into said pocket, said pocket having at least one side which is clear or translucent.

19. A method of making a light emitting panel assembly comprising the steps of weaving a plurality of optical fibers and fill threads extending transversely of the fibers into a light emitting portion having disruptions or bends at discrete locations along the length of the fibers to allow light to be emitted therefrom, the light emitting portion having side edges and end edges, forming one or more light cables from non-woven optical fibers extending from one or both end edges of the light emitting portion, adhering the fibers and fill threads together along at least one of the edges of the light emitting portion to prevent the fibers from separating from the light emitting portion at the one edge, and separating predetermined non-woven fibers which comprise each light cable and mechanically maintaining the separation between the non-woven fibers while attaching a connector to a remote end of the non-woven fibers which comprise each light cable to randomly distribute the fibers in each light cable and provide an interface between each light cable and a remote light source.

20. The method of claim 19 wherein a plurality of such light emitting panel assemblies are continuously made by periodically interrupting the weaving process while continuing to advance the optical fibers to form predetermined lengths of non-woven optical fibers which comprise light cables between successive woven light emitting portions, and cutting the panel assemblies apart at the ends of the non-woven fibers which comprise the respective light cables for each panel assembly.

21. The method of claim 20 further comprising the steps of separating predetermined non-woven fibers which comprise each light cable and mechanically maintaining the separation between the non-woven fibers before cutting the panel assembly with the separated non-woven fibers from the next succeeding panel assembly, and maintaining the separation between the non-woven fibers while attaching a connector to a remote end of the non-woven fibers which comprise each light cable to randomly distribute the fibers in each light cable and provide an interface between each light cable and a remote light source.

22. The method of claim 21 wherein a plurality of fiber harnesses each including a plurality of spaced apart heddles through which individual fibers pass at different locations across substantially the entire width of the panel assemblies are sequentially moved relative to each other to separate the individual non-woven fibers into different layers and the different layers are maintained separated from each other by inserting mechanical dividers between the respective layers before cutting the panel assembly with the separated non-woven fibers from the next succeeding panel assembly, and the non-woven fibers are maintained separated from each other by the mechanical dividers while attaching the connector to a remote end of the non-woven fibers which comprise each light cable.

23. The assembly of claim 8 wherein said fibers are made of plastic, and said means for adhering comprises heat sealing said fibers to said fill threads along said side edges.

24. The assembly of claim 8 wherein said means for adhering comprises adhesive means adhering said fibers and said fill threads together along said one edge.

25. The assembly of claim 8 wherein said means for adhering comprises tape means adhering said fibers and said fill threads together along said side edges.

26. The assembly of claim 8 wherein said fibers and said fill threads are adhered together along another of said end edges of said light emitting portion.

27. The assembly of claim 8 wherein said fibers and said fill threads are adhered together along said side edges of said light emitting portion.

28. The assembly of claim 8 further comprising connector means at a remote end of said light cable which serves as an interface between said light cable and a remote light source.

29. The assembly of claim 28 wherein said light cable comprises a continuation of said fibers in said light emitting portion.

30. The assembly of claim 29 wherein said fibers which comprise said light cable are randomly distributed into a plurality of discrete bundles which collectively form a single bundle of all of said fibers in said light cable.

31. The assembly of claim 30 wherein each of said discrete bundles includes fibers extending from said light emitting portion at different locations across substantially the entire width of said light emitting portion.

32. The assembly of claim 8 wherein said light emitting portion comprises a plurality of separate layers of said woven optical fibers joined together along one of said edges of said light emitting portion.

33. The assembly of claim 32 wherein said layers are joined together such that the fill threads in one layer are offset with respect to the fill threads in another layer to provide for more uniform light output from said light emitting portion.

34. The assembly of claim 32 wherein the fill threads in each layer provide a predetermined weave spacing in each layer, said layers being joined together such that the weave spacing in one of said layers is staggered with respect to the weave spacing in another layer to produce a more uniform light output from said light emitting portion.

35. The assembly of claim 8 wherein said covering means is joined to one of said edges of said light emitting portion.

36. The assembly of claim 8 wherein said light emitting portion is formed by a plurality of separate layers of said woven optical fibers having said disruptions or bends at discrete locations along the length of said fibers to allow light to be emitted therefrom, said layers including said fill threads extending transversely of said fibers in a predetermined weave spacing, said layers being joined together along at least one edge such that the relative weave spacing of said layers is staggered to produce a more uniform light output from said light emitting portion.

37. The method of claim 17 wherein the fibers are made of plastic, and the fibers are heat sealed to the fill threads along the side edges of the light emitting portion to adhere the fibers and fill threads together along the side edges.

38. The method of claim 17 wherein an adhesive is applied to the one edge of the light emitting portion to adhere the fibers and fill threads together along the one edge.

39. The method of claim 17 wherein tape means is applied to the one edge of the light emitting portion to adhere the fibers and fill threads together along the one edge.

40. The method of claim 17 wherein the fibers and fill thread are adhered together along opposite side edges of the light emitting portion.

41. The method of claim 40 wherein the fibers and fill threads are also adhered together along an end edge of the light emitting portion.

\* \* \* \* \*